Jan. 12, 1960  O. G. MARFUGGI  2,920,875
DRINK MIXERS
Filed April 9, 1956  2 Sheets-Sheet 1
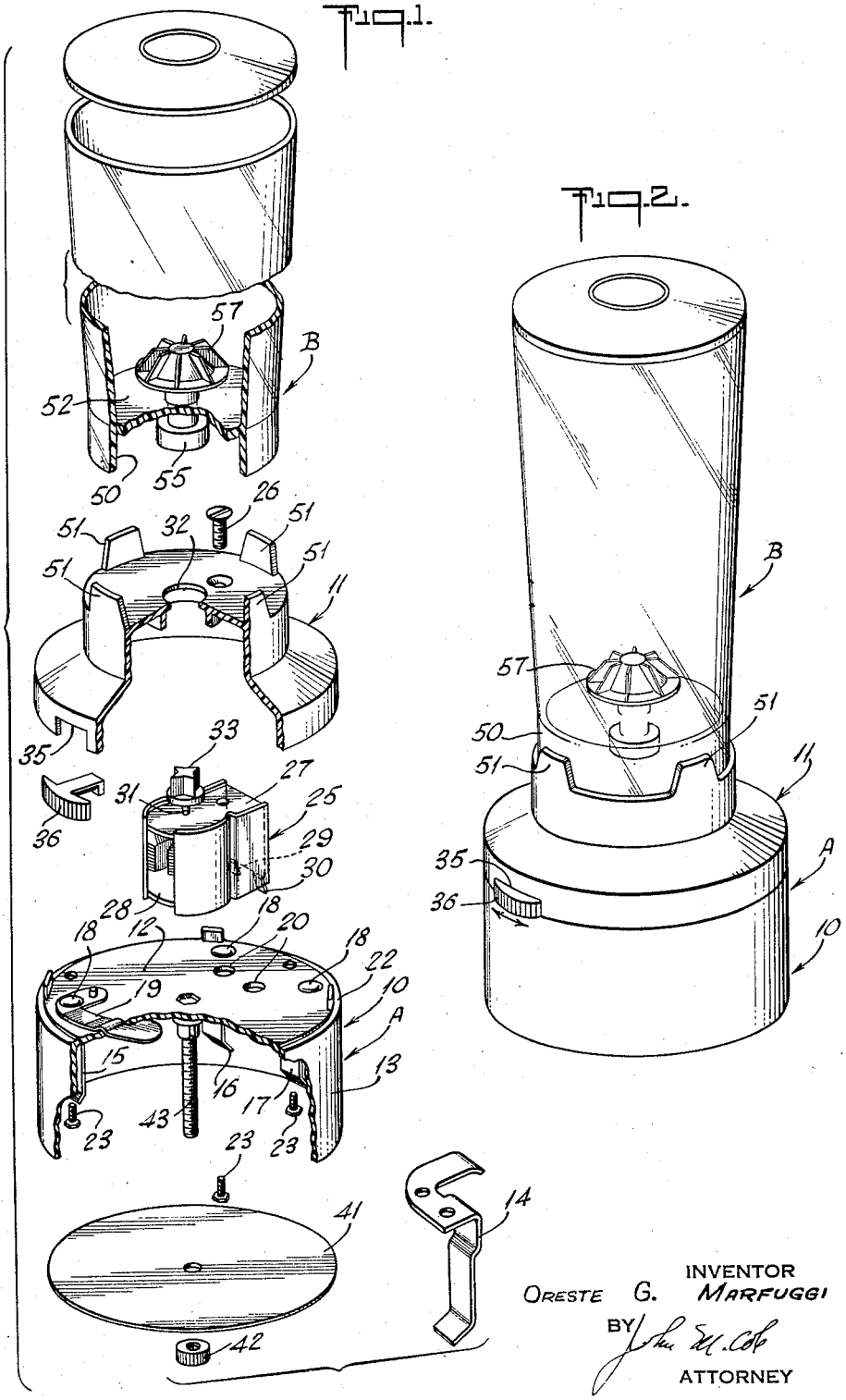
INVENTOR
ORESTE G. MARFUGGI
BY
ATTORNEY Jan. 12, 1960
O. G. MARFUGGI
2,920,875
DRINK MIXERS
Filed April 9, 1956
2 Sheets-Sheet 2
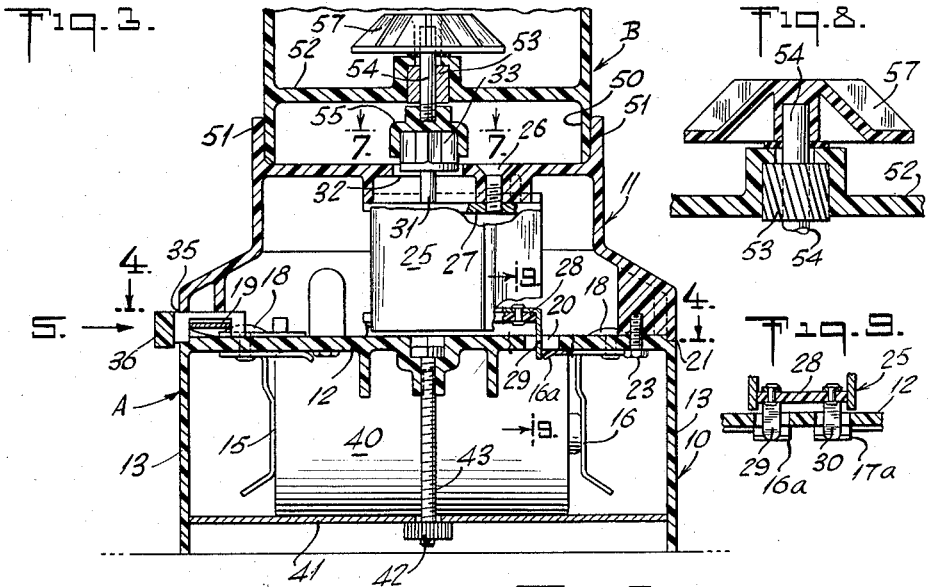
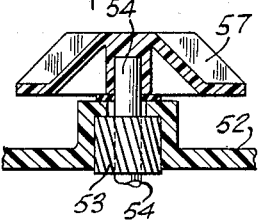
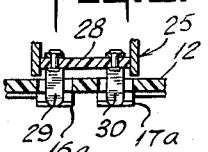
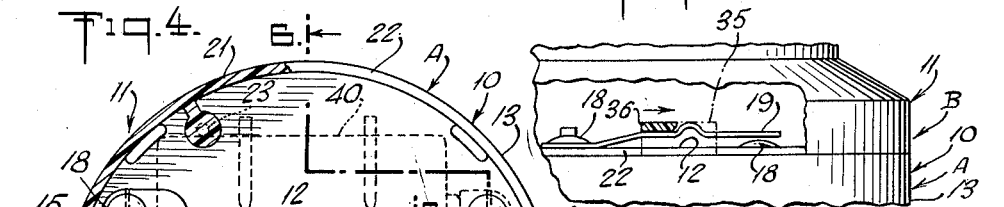
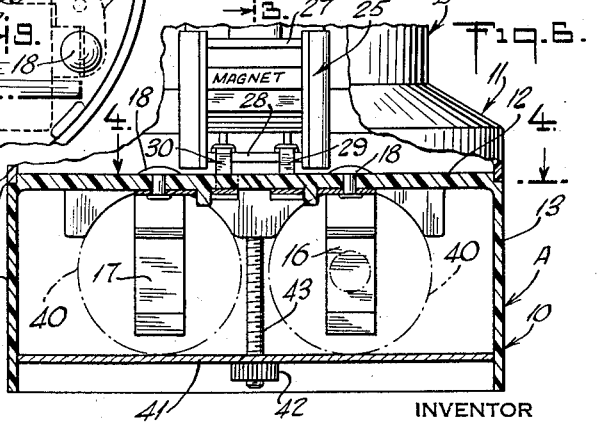
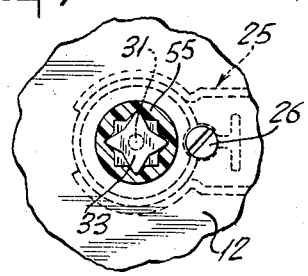
INVENTOR
ORESTE G. MARFUGGI
BY
ATTORNEY

2,920,875
DRINK MIXERS

Oreste G. Marfuggi, Maplewood, N.J., assignor to Marex Manufacturing Company Incorporated, Newark, N.J., a corporation of New Jersey Application April 9, 1956, Serial No. 577,107

4 Claims. (Cl. 259—108)

The present invention relates to drink mixers and is more particularly directed toward self powered, battery operated drink mixers.

The ordinary drink mixer on the market is operated by a motor connected to the house wiring and therefore is not usable when house current is not available, nor is it suitable for use by children as a toy.

The present invention contemplates a drink mixer adapted to mix drinks such as malted milk, ice cream sodas, floats, hot chocolate and the like. As it is self powered, it can be used when away from home, as on picnics, boats, etc., and can be used by children with perfect safety, so far as danger arising from electric current is concerned.

The present invention further contemplates a drink mixer for these purposes wherein the base of the drink mixer carries the motor, the electric switch and the dry cell battery, together with connections for controlling the motor operation. The motor has an upwardly extending coupling. The upper unit of the drink mixer is in the form of a container of the general shape of a drinking glass, and has a shaft in its bottom which carries an agitator at its upper end and a coupling at its lower end engageable with the motor driven coupling.

The present invention further contemplates making substantially all of the non-conducting parts of plastic material which can be readily formed to shape to accommodate the motor, the switch, the contacts and the agitator shaft.

Other and further objects will become apparent as the description proceeds.

The accompanying drawings show, for purposes of illustrating the present invention, one embodiment in which the invention may take form, it being understood that the drawings are illustrative of the invention rather than limiting the same.

In the accompanying drawings:

Figure 1 is an exploded perspective view illustrating the various components employed in the mixer;

Figure 2 is a perspective view of the assembled drink mixer;

Figure 3 is a vertical, sectional view taken on the line 3—3 of Figures 4 and 6;

Figure 4 is a horizontal, sectional view on the line 4—4 of Figures 3 and 6;

Figures 5a and 5b are fragmentary elevational views illustrating the switch in open and closed positions, respectively;

Figure 6 is a sectional view taken on the broken section, lines 6—6 of Figure 4;

Figure 7 is a fragmentary, sectional view on the line 7—7 of Figure 3;

Figure 8 is an enlarged section through the bottom of the drink receptacle; and

Figure 9 is a fragmentary, sectional view on the line 9—9 of Figures 3 and 4.

The lower unit of the device is designated generally by the letter A and the upper unit by the letter B. The lower part of the lower unit is indicated at 10 and the upper part at 11. These are here shown as round, plastic moldings. They could have any suitable configuration.

The part 10 is a plastic molding with an upper horizontal wall 12 and side walls 13. The upper wall 12 carries four downwardly extending battery connecting contacts 14, 15, 16 and 17. These four contacts are alike and are secured in place by rivets indicated at 18.

As shown, the rivet which secures the contact 15 in place also secures an upwardly biased switch contact spring 19 to the upper face of the wall 12. The contact 19 extends above the rivet 18 which supports the contact 14 so as to form a switch contact. The contact members 16 and 17 extend inwardly and pass underneath holes 20, 20 in the upper wall 12 of the bottom piece 10, as indicated at 16a, 17a, Figs. 3, 4 and 9.

The bottom edge 21 of the upper plastic part 11 fits into the groove 22 in the top of the member 13. These two members are secured together by screws indicated at 23.

A small, permanent field, electric motor 25 is secured to the member 11 by a screw indicated at 26, which threads into the metal end plate 27 of the motor. The lower end plate of the motor is an insulating plate, as indicated at 28 and it carries two downwardly extending spring terminals 29 and 30 which pass through the holes 20, 20 and engage the ends 16a, 17a of the contacts 16 and 17. The motor is thus connected to the battery terminals 16 and 17. The motor has a shaft 31 which extends up through an opening 32 in the member 11 and carries a non-circular coupling member 33.

The upper part 11 of the lower unit has a notch indicated at 35 through which extends an insulating switch arm 36. The arm extends about the switch member 19 and is slidable back and forth, as indicated in the drawings. When the switch arm 36 is in the left position, as in Figure 5a, the circuit is open, and when it is shifted to the right hand position indicated in Figure 5b, the switch is closed.

The contacts 14, 15, 16 and 17 are adapted to receive dry cells indicated at 40, 40 so that the motor may be operated under the control of the switch 36. A bottom plate 41 is held in place under the dry cells by a nut 42, threaded on a screw 43.

The upper unit B is preferably of the size and shape of a 16 ounce drinking glass, and preferably made of transparent plastic. It has a bottom flange 50 which is adapted to be received between the upwardly extending projections 51 of the plastic member 11. The bottom wall 52 of the receptacle is provided with a metal insert 53 which forms a bearing for a shaft 54. This shaft carries at its lower end a coupling member 55 adapted to pass down about the coupling member 33 on the motor shaft when the receptacle is in position, as in Figure 3.

The upper end of the shaft 54 carries an agitator 57 in the bottom of the receptacle of the upper unit B.

The above device is one which is well suited for drink mixing, particularly where house current is not available. It will accommodate two dry cells, 1¼ inch in diameter. These cells will furnish sufficient energy for operating the motor to mix a large number of drinks. After the drink is mixed, the receptacle can be used as a drinking glass. It will be noted that the motor and battery are very effectively protected from accidental spillage of liquid.

Since it is obvious that the invention may be embodied in other forms and constructions within the scope of the claims, I wish it to be understood that the particular form shown is but one of these forms, and, various modifications and changes being possible, I do not otherwise limit myself in any way with respect thereto.

What is claimed is:

1. A self powered drink mixer comprising a lower unit and an upper unit including a drink receptacle, the two units having cooperative configuration so that the upper unit may be rested on top of the lower unit in a fixed position, the upper unit having a vertical shaft carrying an agitator in the bottom of the receptacle and a coupling below the bottom of the receptacle, the lower unit having an electric motor provided with a coupling extending from said lower unit and interengageable with the first mentioned coupling, a dry cell battery, a motor control switch including a switch operating handle slidably carried by said lower unit and connections between the motor, battery and switch for starting and stopping the motor and wherein the battery is in a downwardly opening chamber and the motor and switch are in a second chamber, said chambers being formed of insulating material and secured together with the battery chamber closing the second chamber.

2. A self powered drink mixer comprising a preassembled lower unit which includes a dry cell battery, a switch, a motor having a vertical shaft, electrical connections between the battery, the switch and the motor for controlling the motor, upper and lower casing parts about the battery, the switch and motor, the upper casing part enclosing said motor and switch and having an opening in the top thereof through which the shaft of the motor extends and said lower casing part enclosing the battery and a coupling carried by the upper end of the shaft; and an upper unit readily separable from the lower unit and including a drink receptacle normally seated on the top of the upper casing part, a second shaft extending through the bottom of the receptacle, a coupling secured to the lower end of the second shaft and cooperable with the motor driven coupling, and an agitator carried by the second shaft inside the drink receptacle and wherein, the lower casing part is an inverted chamber forming member having spring clips for holding the battery, the upper casing part together with the upper wall of the lower part forms a closed chamber for the motor and switch.

3. A self powered drink mixer comprising a battery receiver open at the bottom and closed at the top and made of insulating material, downwardly extending conducting straps carried by the top of the battery receiver and engaging the terminals of at least two dry cells, two of the straps having portions accessible through holes in the top of the receiver, a fixed switch contact connected to another strap, a cooperable movable switch contact carried by the battery receiver and connected to a fourth strap, a motor casing secured to the top of the battery receiver, a motor secured to the motor casing and having terminals extending through holes in the top of the battery receiver and bearing on the first two straps and an upwardly extending shaft provided with a coupling, and a drink containing receptacle normally resting on top of said motor casing and having a freely rotatable shaft extending through the bottom thereof, the latter shaft having a coupling at its lower end cooperable with the motor shaft coupling and an agitator at its upper end in the bottom of the receptacle.

4. In a self powered drink mixer having a drink containing receptacle and a freely rotating shaft extending through the bottom thereof with the end of said shaft within the receptacle carrying an agitator, means for supporting said receptacle and driving said shaft comprising battery receiver open at the bottom and closed at the top and made of insulating material, downwardly extending conducting straps carried by the top of the battery receiver and engaging the terminals of at least one dry cell, said straps having portions accessible through holes in the top of the receiver, a fixed switch contact connected to at least one strap, a cooperable, movable switch contact carried by the battery receiver, a motor casing secured to the top of the battery receiver, a motor secured to said motor casing and having terminals electrically contacting said battery strap and the movable switch contact upon joinder of the motor casing and battery receiver, said motor having a shaft extending upwardly through the motor casing and carrying a coupling engaging the outer end of the first said shaft carried by said receptacle and said motor casing including means for receiving and holding said receptacle with said receptacle shaft and motor shaft in engagement one with the other.

References Cited in the file of this patent

UNITED STATES PATENTS

| | | |
|---|---|---|
| 633,801 | De Castro | Sept. 26, 1899 |
| 2,042,176 | Hausman | May 26, 1936 |
| 2,664,002 | Anderson | Dec. 29, 1953 |
| 2,731,767 | Holt | Jan. 24, 1956 |
| 2,744,201 | Glaser | May 1, 1956 |
| 2,820,619 | Dache | Jan. 21, 1958 |